Nov. 26, 1929.    R. F. LONABERGER ET AL    1,737,379
HEAVY FUEL VAPORIZER FOR INTERNAL COMBUSTION ENGINES
Filed April 24, 1925    4 Sheets-Sheet 1
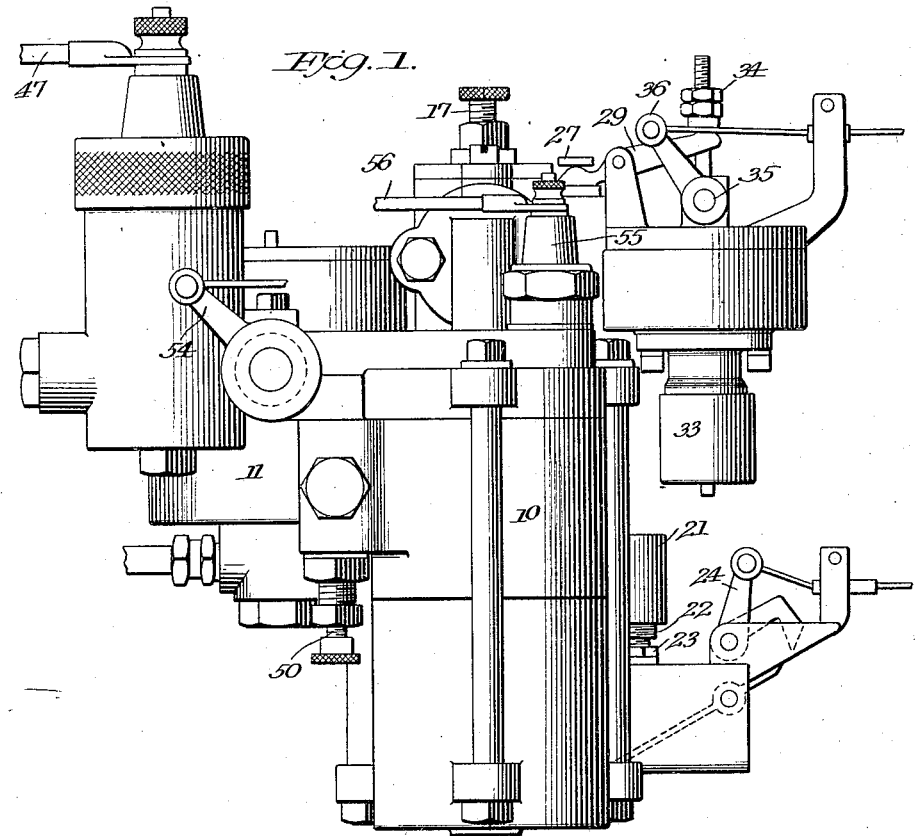
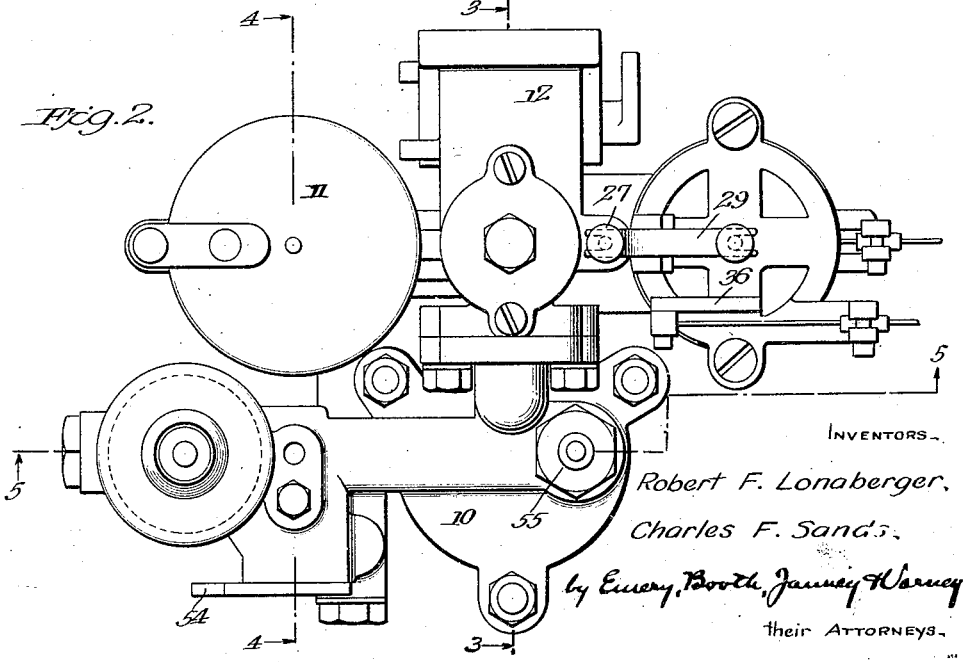
INVENTORS.
Robert F. Lonaberger,
Charles F. Sands,
by Emery, Booth, Janney & Varney
their ATTORNEYS.

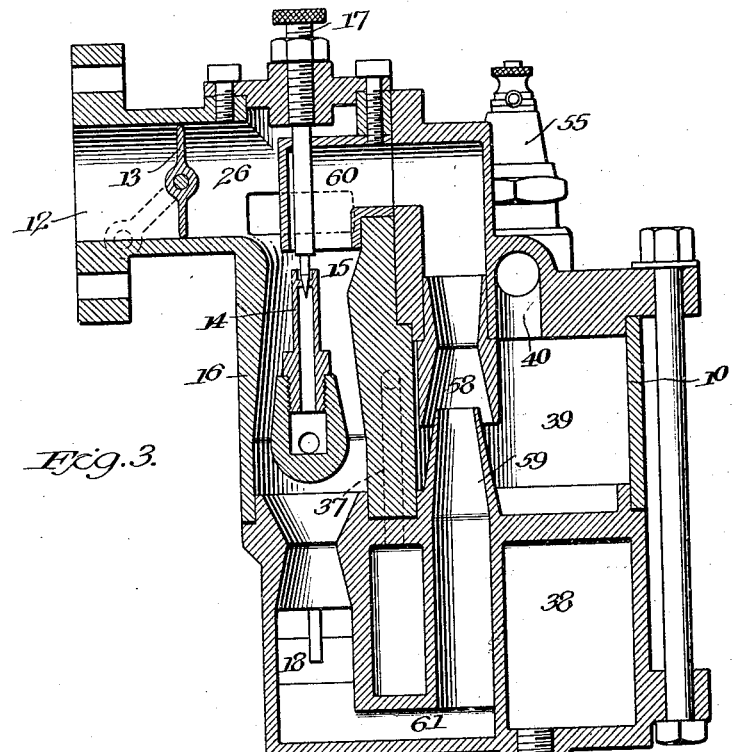
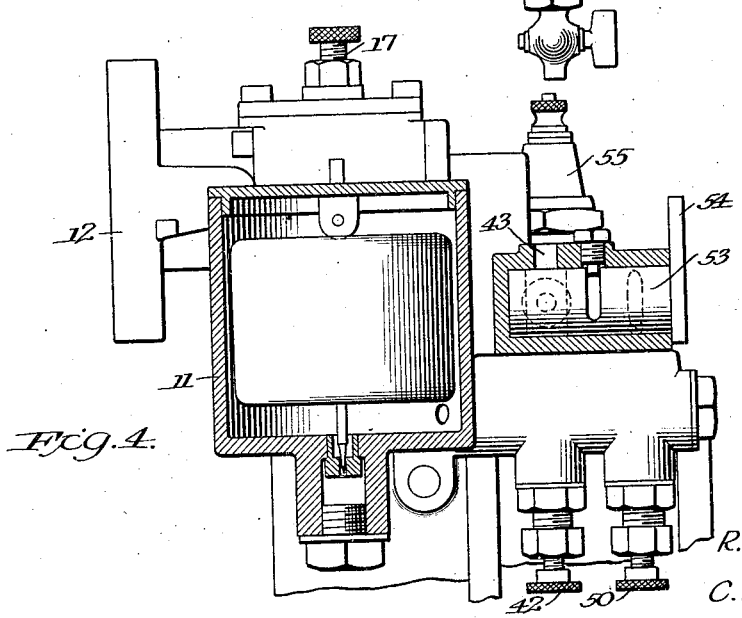

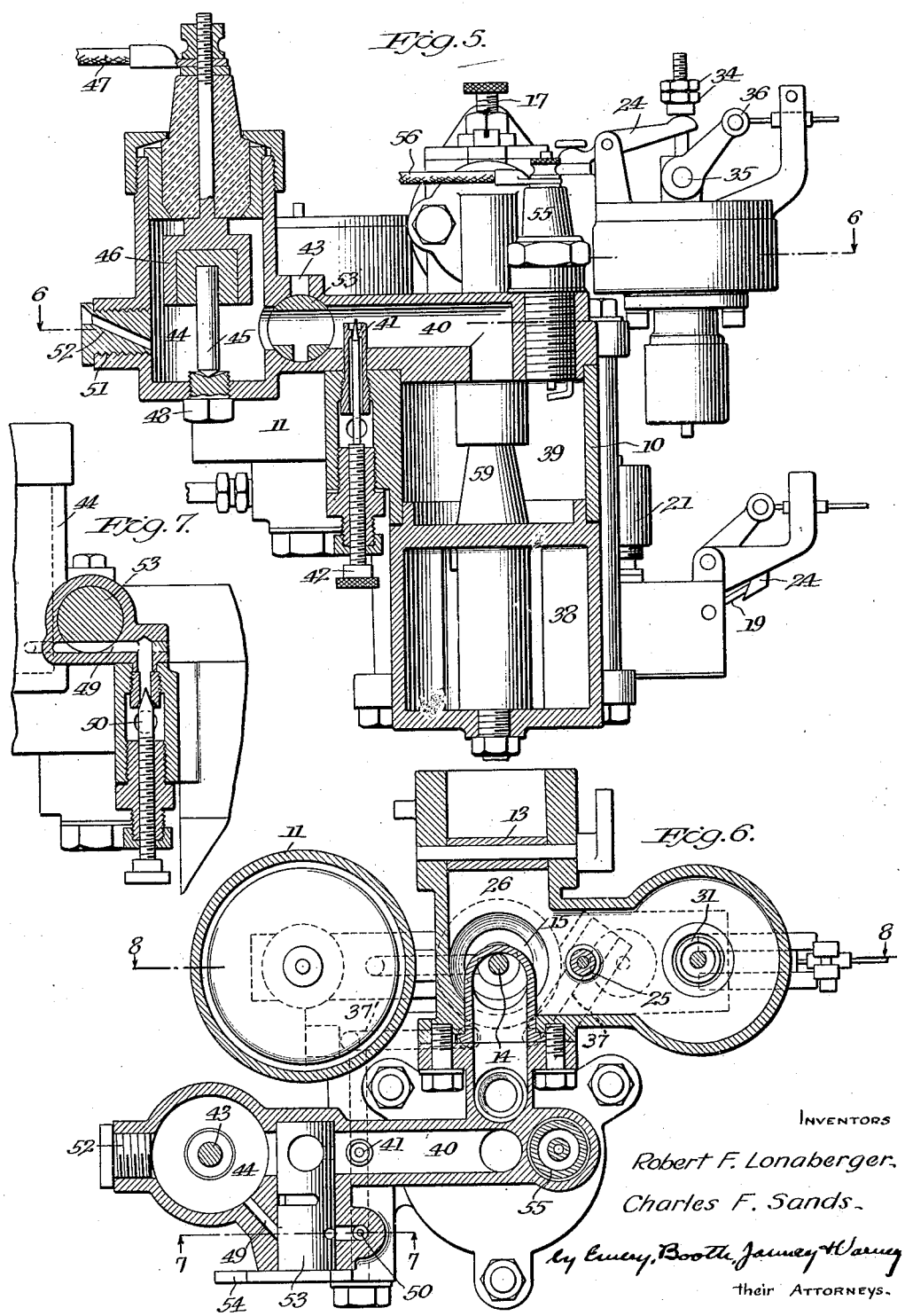

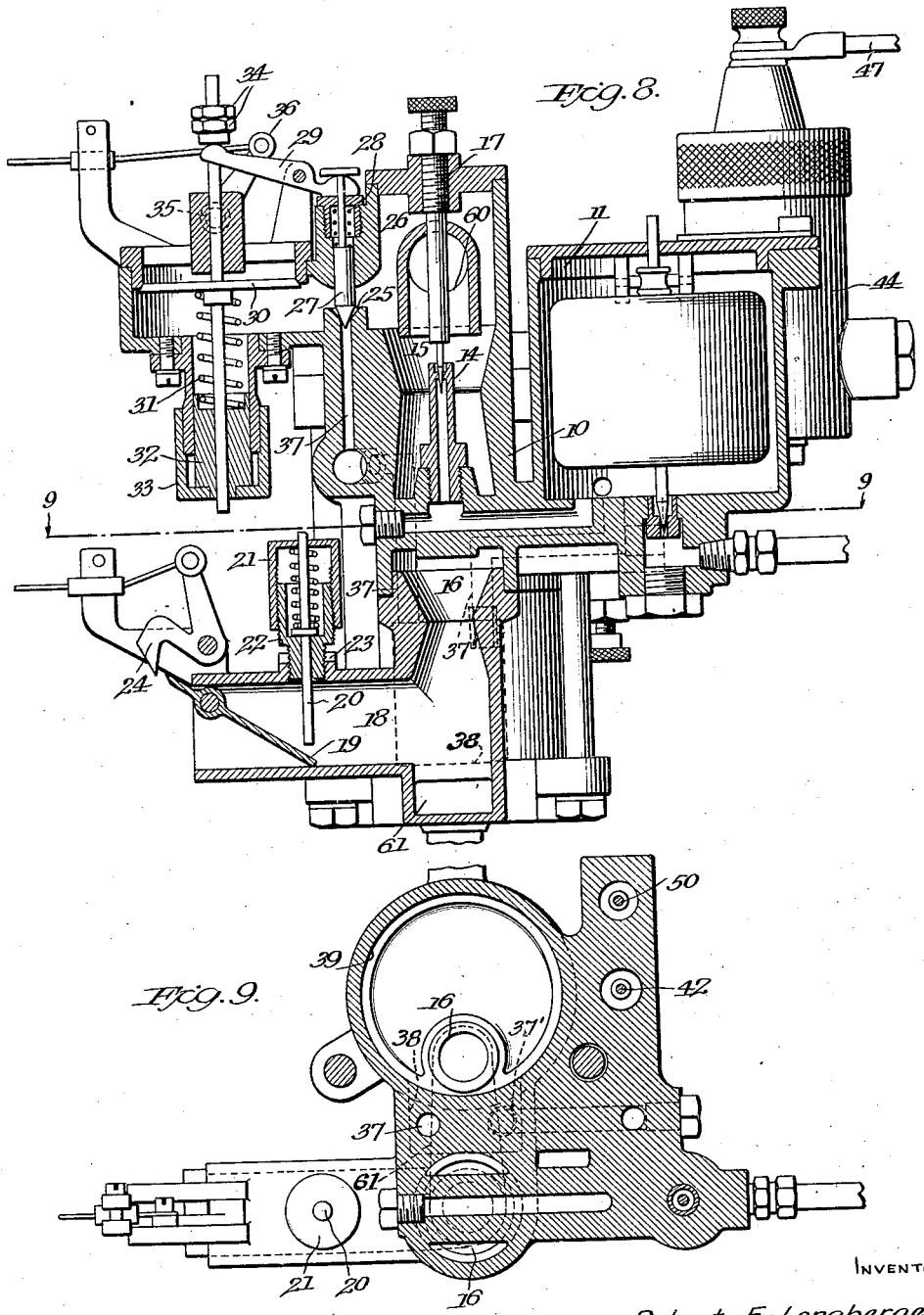

Patented Nov. 26, 1929

1,737,379

UNITED STATES PATENT OFFICE

ROBERT F. LONABERGER AND CHARLES F. SANDS, OF READING, PENNSYLVANIA, ASSIGNORS TO LLOYD A. UNGER, TRUSTEE

HEAVY-FUEL VAPORIZER FOR INTERNAL-COMBUSTION ENGINES

Application filed April 24, 1925. Serial No. 25,577.

This invention aims to improve the operation of internal combustion engines of the type utilizing a mixture of air and a volatile liquid fuel, and more particularly to adapt such engines to operation with heavy liquid fuels not easily volatilized, such as kerosene, petroleum distillate and fuel oil for example.

The invention further aims to enable non-volatile fuels to be utilized in operating internal combustion engines primarily designed for running on gasoline, to simplify the construction of heavy fuel vaporizers, and to adapt one and the same vaporizer for producing a suitable explosive mixture from either light or heavy fuels.

Further aims and advantages of the invention appear hereinafter in connection with the description of the illustrative embodiment thereof shown in the drawings, wherein Fig. 1 is a full side elevation of a vaporizer primarily designed for automobile engines, but adapted for use with any type of engine;

Fig. 2 is a top plan view of the same;

Fig. 3 is a vertical central cross-section of the vaporizer on the line 3—3 in Fig. 2;

Fig. 4 is a vertical cross-section and partial elevation of the same, the section being taken on the line 4—4 in Fig. 2;

Fig. 5 is a vertical cross-section on the line 5—5 in Fig. 2;

Fig. 6 is a horizontal cross-section on the line 6—6 in Fig. 5;

Fig. 7 is a vertical cross-section and fragmentary side elevation, the cross-section being taken on the line 7—7 in Fig. 6;

Fig. 8 is a vertical cross-section on the line 8—8 in Fig. 6; and

Fig. 9 is a horizontal cross-section on the line 9—9 in Fig. 8; the respective cross-sectional views being taken on the lines and looking in the direction of the arrows numbered to correspond thereto in the figures mentioned.

The embodiment of the invention illustrated in the drawings comprises a body or casing 10 of suitable construction for supporting the various operating parts, and which is provided with a suitable float controlled fuel supply chamber 11 and a flanged outlet pipe 12 (see Figs. 2 and 3) for conducting the explosive mixture produced to the inlet pipe of the engine. This flanged pipe may form a support for the vaporizer. A throttle valve 13 may be fitted in the outlet pipe 12 for controlling the supply of fuel mixture to the engine in the usual manner.

The main fuel nozzle or jet 14 (see Figs. 3 and 8) is arranged in the throat 15 at the upper end of the main mixing tube 16, and an adjustable needle valve 17 is arranged above the nozzle to regulate the amount of liquid fuel delivered by the nozzle. The lower end of the mixing tube 16 has an auxiliary air inlet 18 closed by an automatic air valve 19 which is opened by the suction of the motor. A spring pressed pin 20 limits and controls the amount of opening of this valve 19. The tension of the valve pin spring may be adjusted to suit the conditions of use of the vaporizer by turning the housing cap 21, which is threaded on to the spring housing 22, likewise adjustable to vary the point at which the pin 20 will be engaged by the valve 19. A lock nut 23 holds the spring housing in adjusted position. This auxiliary air valve should be adjusted to suit the amount of opening of the main fuel nozzle 14 for ordinary running conditions at normal engine speeds. When starting the valve 19 may be held closed by means of a bell crank lever 24 having suitable means for controlling it from a convenient point.

For high speeds and full load conditions an auxiliary fuel nozzle 25 is provided (see Fig. 8) which discharges into the main mixing chamber 26 above the throat 15. The nozzle 25 is normally closed by a valve 27 held on its seat by a spring 28 but which may be lifted by a lever 29 controlled by the high speed air valve 30. This valve 30 is normally held up to close the opening from the outer air into the mixing chamber by an adjustable spring 31. The spring 31 rests on a guide block 32 in the spring housing 33, through which the valve stem slides. The opposite end of the valve stem projects above the upper guide and has its upper end screw-threaded to receive adjusting and lock nuts 34 which bear against and actuate the lever 29 when the valve 30 is opened. A clamping screw 35, actuated by an arm 36, is provided for holding the valve closed at starting. The spring 31 is adjusted to hold the valve 30 closed except when the load on the engine is heavy so as to require a wide throttle opening, as at high speeds or when developing full power on a hill. The nozzle 25 is set at a level above that of the fuel in the supply chamber 11 to prevent flooding in case of derangement and to avoid feeding an undue amount of fuel.

Vaporized or partly vaporized fuel is supplied to the auxiliary fuel nozzle 25 through a duct 37 (see Figs. 6 and 8) leading from the top of the hot fuel well and vaporizing chamber 38 (see Fig. 3) which is kept supplied with liquid fuel from the fuel supply chamber 11 through the duct 37′ having its outlet below the top of the hot fuel well 38 (see Fig. 8), thereby preventing vaporized fuel from blowing back into the fuel supply chamber. Water, dirt, and non-volatile matter heavier than the fuel will be trapped in the chamber 38 and may be drawn out periodically through the opening in the bottom which may be provided with a cock for this purpose. The duct 37 passes alongside of the main mixing tube 16 between it and the heated wall of the chamber 39, hereinafter described, located immediately above the hot fuel well (see Figs. 3 and 9) for the purpose of further heating and vaporizing the fuel prior to its issuance from the nozzle 25.

The combustion and heat exchange or gasifier chamber 39 (see Fig. 5) is supplied with a rich combustible fuel mixture from the mixing tube 40, in which is located a fuel jet nozzle 41 supplied from the supply chamber 11 through a suitable duct. The amount of orifice opening of the nozzle 41 is controlled by means of the needle valve 42 which is provided with the usual screw adjustment. Sufficient air for combustion of a portion of the fuel is admitted to the mixing tube 40 through the port 43 under normal running conditions (as shown in Figs. 4 and 6), thereby enabling this part of the apparatus to function as an atomizer operated by suction of the engine.

Upon starting operation of the vaporizer a mixture of heated air and vaporized fuel is admitted to the gasifier mixing tube 40 through the electric heater chamber 44 (see Fig. 5) in which an electric resistance element 45, preferably a carbon electrode, is arranged in a suitable insulated holder 46 having connection to a storage battery or other source of electric energy by means of the conductor 47. The resistance element is preferably grounded at its free end on a suitable contact block 48 in the bottom of the heater chamber 44 so as to form an arc when the current is on.

Fuel for starting the operation of the vaporizer may be supplied to the heater chamber 44 through the duct 49 controlled by the adjustable needle valve 50 (see Fig. 7). Air may be admitted from the atmosphere to the heater chamber 44 through the opening 51 which may be fitted with an orifice block 52 having an orifice of a size suitable to the fuel used.

A three way cock 53 (see Figs. 4, 5, 6 and 7) is fitted in the gasifier mixing tube 40 for closing the opening 43 from the atmosphere, and opening the fuel supply duct 49 and the mixture outlet passage from the heater chamber 44 to the gasifier chamber 39 for starting the vaporizer, both of which are closed by the cock under normal running conditions. This cock 53 has a handle which may be connected in any suitable manner to a control handle (not shown) on the instrument board of the automobile or other convenient location. In Figs. 1 and 6 this valve is shown in the normal running position and in Figs. 5 and 7 it is shown in the starting position.

A spark plug 55 is screwed into the gasifier chamber 39 to ignite the combustible mixture therein. This spark plug is connected to a jump spark coil or other source of high tension current by means of a suitable conductor 56, whereby a stream of spark is maintained across the gap between the points of the spark plug while the vaporizer is in operation, thereby insuring the ignition and continuous burning of the rich fuel mixture in the chamber 39, resulting in its complete gasification.

The gasified fuel mixture (containing inflammable products of combustion) in the chamber 39 is drawn through the throat 58 (see Fig. 3) where it mixes with air from the nozzle 59, and is discharged into the mixing chamber 26 above the throat 15. Preferably a hood 60 is provided for deflecting the mixture of gasified fuel products and air down around the main fuel nozzle 14 and commingling them with the mixture of atomized fuel and air flowing up past the nozzle. A passage 61 connects the auxiliary air inlet 18 with the nozzle 59, to supply air to the gasified fuel mixture in increasing volume as the suction of the engine increases, and thereby counteract the tendency of the mixture to increase in richness due to the greater flow from the nozzle 41. This comparatively cold air also chills the products of combustion entering the throat 58 below the point of incandescence, and checks further combustion of the unburned fuel, which is completely vaporized by the high temperature of the mixture and walls of the combustion chamber.

The hot fuel well 38 is arranged below the gasifier chamber 39 from which it is separated by a transverse wall against which the incandescent stream of burning fuel mixture impinges, thereby maintaining the temperature of the hot fuel well and liquid fuel therein above the volatilization point of the fuel. The temperautre of the gasifier chamber and hot fuel well may be regulated by adjusting the amount of fuel supplied through the nozzle 41 and by controlling the flow of air through the port 43, which may be accomplished by manipulating the cock 53 from time to time. When the engine is running idle with throttle closed the cock 53 may be partly closed to diminish the air supply and increase the suction on the nozzle 41 to provide a richer mixture, part of the fuel burning to vaporize the remainder and thereby keep the motor running on the gasified mixture, without the help of the main fuel nozzle.

For starting operation of the vaporizer, the control means for closing the auxiliary air valve 19 and high speed air valve 30 are set to close these valves, and the cock 53 is turned to admit air and fuel from the heater chamber 44 to the tube 40. First, fuel flows through the passage 49 into the heater chamber, and the next stage is the heating of this fuel by the electric heater to the vaporization point, whereupon it mixes with air and forms a burning mixture suitable to initiate the operation of the fuel gasification chamber. The need of the electric heater is only momentary, so the cock 53 may be turned to normal operation position immediately. After the motor starts turning over, which may be accomplished by any suitable mechanical device, the suction thereby produced causes fuel to be sucked up from the main fuel nozzle 14 and gasifier fuel nozzle 41, part of which is burned in the chamber 39, forming inflammable gases, and the remainder is volatilized and drawn into the engine with air entering through the port 43 in the form of a rich gaseous mixture, quite suitable for starting a cold engine. As soon as the vaporizer and engine cylinder warm up, the auxiliary air valve 19 and high speed valve 30 are released to permit normal operation.

The normal operation of the vaporizer provides for a small amount of auxiliary air to be admitted through the valve 19 at low speeds and minimum throttle opening, which air divides, part going through the throat 15 and part going through the passage 61 and commingling with gaseous products from the chamber 39, and both parts coming together at the main fuel nozzle 14 to pick up additional fuel from the latter. As part of the auxiliary air enters the mixing tube 16 at its top, above the nozzle 14, thus "bleeding" the main fuel nozzle 14, there is little tendency for this nozzle to "load" the vaporizer as the suction increases.

As the engine speed increases, or the throttle is opened wider, the amount of suction increases, and the auxiliary air valve 19 opens automatically to admit a greater proportion of air to fuel and still further bleed the main fuel nozzle. The amount of opening of the valve 19 may be controlled to suit the condition of medium demand upon the engine. At high speeds or wide open throttle, the high speed air valve 30 is opened automatically, thereby permitting vaporized fuel to flow from the nozzle 25 and commingle with the entering air and mixture in the upper end of the mixing tube 16. The amount of opening of this valve and nozzle may be adjusted to suit the engine and fuel to produce the results desired.

It is evident that changes in the arrangement and dimensions of the several parts may be made to suit different conditions of use, and the invention is not restricted to the embodiment shown and described.

In the claims the word "throat" is used to designate a connecting passage not necessarily of less cross-sectional area than the chambers or passages that it connects.

We claim the following as our invention:

1. A vaporizer comprising a mixing tube and a mixing chamber connected by a throat, a fuel nozzle in said throat, a liquid fuel supply well and duct therefrom to said fuel nozzle, a fuel vaporizing chamber, a heating chamber associated therewith, a suction operated air valve for admitting air to said mixing chamber, a second fuel nozzle between said air valve and mixing chamber, a fuel duct from said fuel vaporizing chamber to said second fuel nozzle, and means actuated by said air valve for controlling the discharge of fuel vapor from said second nozzle.

2. A vaporizer comprising a mixing tube and a mixing chamber connected by a throat, a fuel nozzle in said throat, a liquid fuel supply well and duct therefrom to said fuel nozzle, a fuel vaporizing chamber, a heating chamber associated therewith, an electric resistance element in association with said heating chamber for starting operation of the vaporizer, a suction operated air valve for admitting air to said mixing chamber, a second fuel nozzle between said air valve and mixing chamber, a fuel duct from said fuel vaporizing chamber to said second fuel nozzle, and means actuated by said air valve for controlling the discharge of fuel vapor from said second nozzle.

3. A vaporizer comprising a mixing tube and a mixing chamber connected by a throat, a fuel nozzle in said throat, a liquid fuel supply well and duct therefrom to said fuel nozzle, a fuel vaporizing chamber, a heating chamber associated therewith, means for supplying liquid fuel to said heating chamber from said well, an igniting device in said heating chamber, a suction operated air valve for admitting air to said mixing chamber, a second fuel nozzle between said air valve and mixing chamber, a fuel duct from said fuel vaporizing chamber to said second fuel nozzle, and means actuated by said air valve for controlling the discharge of fuel vapor from said second nozzle.

4. A vaporizer comprising a mixing chamber, a fuel nozzle, a liquid fuel supply well and duct therefrom to said fuel nozzle, a fuel vaporizing chamber, a heating chamber associated therewith, means for supplying liquid fuel to said heating chamber from said well, an igniting device in said heating chamber, a suction operated air valve for admitting air to said mixing chamber, a second fuel nozzle between said air valve and mixing chamber, a fuel duct from said fuel vaporizing chamber to said second fuel nozzle, and means for controlling the discharge of fuel vapor from said second nozzle.

5. A vaporizer comprising a mixing tube and a mixing chamber connected by a throat, a fuel nozzle in said throat, a liquid fuel supply well and duct therefrom to said fuel nozzle, a fuel vaporizing chamber, a heating chamber associated therewith, an electric resistance element in association with said heating chamber for starting operation of the vaporizer, a suction operated air valve for admitting air to said mixing chamber, a second fuel nozzle between said air valve and mixing chamber, a fuel duct from said fuel vaporizing chamber to said second fuel nozzle, and means for controlling the discharge of fuel vapor from said second nozzle, said controlling means being adjustable to the speed and load conditions.

6. A vaporizer comprising a mixing chamber, a fuel nozzle therein, a liquid fuel supply well and duct therefrom to said nozzle, a fuel vaporizing chamber, a heating chamber associated therewith and having an outlet duct leading to said mixing chamber, means for supplying a combustible mixture of liquid fuel and air to said heating chamber and for maintaining combustion thereof, a suction operated air valve for admitting air to said mixing chamber, a second fuel nozzle between said air valve and mixing chamber, a fuel duct from said fuel vaporizing chamber to said second fuel nozzle, and means actuated by said air valve for controlling the discharge of fuel vapor from said second nozzle.

7. A vaporizer comprising a mixing chamber, a fuel nozzle therein, a liquid fuel supply well and duct therefrom to said nozzle, a combustion chamber discharging into said mixing chamber adjacent to said nozzle, means for supplying fuel mixture thereto, a fuel vaporizing chamber in heat exchange relation to said combustion chamber, said vaporizing chamber discharging into said mixing chamber, means for controlling the flow of vaporized fuel from said vaporizing chamber, and means for maintaining combustion in said combustion chamber.

8. A vaporizer comprising a mixing chamber, a fuel nozzle therein, a liquid fuel supply well and duct therefrom to said nozzle, a combustion chamber discharging into said mixing chamber adjacent to said nozzle, means for supplying fuel mixture thereto, a fuel vaporizing chamber in heat exchange relation to said combustion chamber, said vaporizing chamber discharging into said mixing chamber, means for controlling the flow of vaporized fuel from said vaporizing chamber, an air inlet discharging into said mixing tube past the outlet from said vaporizing chamber, and means for maintaining combustion in said combustion chamber.

9. A vaporizer comprising a fuel nozzle, a liquid fuel supply well and duct therefrom to said nozzle, a combustion chamber, means for supplying fuel mixture thereto, a fuel vaporizing chamber in heat exchange relation to said combustion chamber, means for controlling the flow of vaporized fuel from said vaporizing chamber, including a nozzle, an auxiliary air valve discharging past the outlet from said vaporizing chamber, means associated with said auxiliary valve for opening said nozzle when said valve is opened by the suction, and means for maintaining combustion in said combustion chamber.

10. A vaporizer comprising a fuel nozzle, a liquid fuel supply well and duct therefrom to said nozzle, a combustion chamber, means for supplying fuel mixture thereto, a fuel vaporizing chamber in juxtaposition to said combustion chamber, means for controlling the flow of vaporized fuel from said vaporizing chamber, including a nozzle, an auxiliary air valve discharging past the outlet from said vaporizing chamber, adjustable means for controlling the amount of opening of said valve, means associated with said auxiliary valve for opening said nozzle when said valve is opened by the suction, and means for maintaining combustion in said combustion chamber.

11. A vaporizer comprising a fuel nozzle, a liquid fuel supply well and duct therefrom to said nozzle, a combustion chamber, means for supplying fuel mixture thereto, a fuel vaporizing chamber in juxtaposition to said combustion chamber, means for controlling the flow of vaporized fuel from said vaporizing chamber, including a nozzle, an auxiliary air valve discharging past the outlet from said vaporizing chamber, adjustable means for controlling the amount of opening of said valve, means associated with said auxiliary valve for opening said nozzle when said valve is opened by the suction, an electric heater for increasing the temperature of said combustion chamber and mixture at starting, and means for maintaining combustion in said combustion chamber.

12. A vaporizer comprising a fuel nozzle, a liquid fuel supply well and duct therefrom to said nozzle, a combustion chamber, means for supplying fuel mixture thereto, a fuel vaporizing chamber in juxtaposition to said combustion chamber, means for controlling the flow of vaporized fuel from said vaporizing chamber, including a nozzle, an auxiliary air valve discharging past the outlet from said vaporizing chamber, means associated with said auxiliary valve for opening said nozzle when said valve is opened by the suction, an electric heater for increasing the temperature of said combustion chamber and mixture at starting, and means for maintaining combustion in said combustion chamber.

13. A vaporizer comprising a fuel nozzle, a liquid fuel supply well and duct therefrom to said nozzle, a combustion chamber, means for supplying fuel mixture thereto, a fuel vaporizing chamber in juxtaposition to said combustion chamber, means for controlling the flow of vaporized fuel from said vaporizing chamber, including a nozzle, an auxiliary air valve discharging past the outlet from said vaporizing chamber, an electric heater for increasing the temperature of said combustion chamber and mixture at starting, and means for maintaining combustion in said combustion chamber.

14. A vaporizer comprising a fuel nozzle, a liquid fuel supply well and duct therefrom to said nozzle, a combustion chamber, means for supplying fuel mixture thereto, a fuel vaporizing chamber in juxtaposition to said combustion chamber, means for controlling the flow of vaporized fuel from said vaporizing chamber, including a nozzle, an electric heater for increasing the temperature of said combustion chamber and mixture at starting, and means for maintaining combustion in said combustion chamber.

15. A vaporizer for internal combustion engines provided with electric starting devices comprising a combustion heater having a normal fuel supply, a starting fuel chamber for supplying heated fuel to said combustion heater upon starting the engine, an electrode in said starting fuel chamber for heating the same when the electric starting device is actuated, an air supply to said chamber, a liquid fuel supply to said chamber, and manually operated means for controlling said liquid fuel supply.

16. A vaporizer for internal combustion engines provided with electric starting devices comprsing a combustion heater having a normal fuel supply, a starting fuel chamber for supplying heated fuel to said combustion heater upon starting the engine, an electrode in said starting fuel chamber for heating the same when the electric starting device is actuated, an air supply to said chamber, means for closing the outlet from said chamber for the vaporized fuel and air, and means associated therewith for closing the liquid fuel supply.

17. A vaporizer for heavy fuels comprising a combustion chamber, a normal fuel supply therefor and a starting fuel chamber, an electrode in said starting fuel chamber for heating the same, an air supply to said chamber and a discharge passage therefrom, a liquid fuel supply to said chamber and a rotary valve controlling the discharge passage from said chamber and the liquid fuel supply passage to said chamber.

18. A vaporizer comprising a mixing chamber, a fuel vapor nozzle associated therewith, a vaporizer chamber communicating with said nozzle, means for supplying liquid fuel to said vaporizer chamber, a combustion chamber adjacent to said vaporizer chamber, an outlet from said combustion chamber into a passage leading to said mixing chamber, means for admitting air to said passage in a stream leading past said outlet, and a burner mixing chamber having fuel and air supply means and discharging into said combustion chamber.

19. A vaporizer comprising a mixing chamber, a fuel vapor nozzle associated therewith, a vaporizer chamber communicating with said nozzle, means for supplying liquid fuel to said vaporizer chamber, a combustion chamber adjacent to said vaporizer chamber, an outlet from said combustion chamber into a tubular passage leading through said combustion chamber to said mixing chamber, means for admitting air to said passage in a stream leading past said outlet, and a burner mixing chamber having fuel and air supply means and discharging into said combustion chamber.

20. A vaporizer comprising a mixing chamber, a fuel vapor nozzle associated therewith, a vaporizer chamber communicating with said nozzle, means for supplying liquid fuel to said vaporizer chamber, a combustion chamber adjacent to said vaporizer chamber, an annular outlet from said combustion chamber into a tubular passage leading through said combustion chamber to said mixing chamber, means for admitting air to said passage in a stream leading past said outlet, valve means for controlling said air, and a burner mixing chamber having fuel and air supply means and discharging into said combustion chamber.

21. A vaporizer comprising a mixing chamber, a fuel vapor nozzle associated therewith, an auxiliary air valve for said mixing chamber, and means associated therewith for controlling the flow of fuel vapor through said nozzle, a vaporizer chamber communicating with said nozzle, means for supplying liquid fuel to said vaporizer chamber, a combustion chamber adjacent to said vaporizer chamber, an outlet from said combustion chamber into a passage leading to said mixing chamber, means for admitting air to said passage in a stream leading past said outlet, and a burner mixing chamber having fuel and air supply means and discharging into said combustion chamber.

22. A vaporizer comprising a mixing chamber, a fuel vapor nozzle associated therewith, an auxiliary air valve for said mixing chamber, and means associated therewith for controlling the flow of fuel vapor through said nozzle, a vaporizer chamber communicating with said nozzle, means for supplying liquid fuel to said vaporizer chamber, a combustion chamber adjacent to said vaporizer chamber, an outlet from said combustion chamber into a passage leading to said mixing chamber, means for admitting air to said passage in a stream leading past said outlet, a burner mixing chamber having fuel and air supply means and discharging into said combustion chamber, and means for closing said auxiliary air valve and vapor nozzle during the starting operation of said vaporizer.

23. A vaporizer comprising a mixing chamber, a fuel vapor nozzle associated therewith, a vaporizer chamber communicating with said nozzle, means for supplying liquid fuel to said vaporizer chamber, a combustion chamber adjacent to said vaporizer chamber, an outlet from said combustion chamber into a tubular passage leading through said combustion chamber to said mixing chamber, means for admitting air to said passage in a stream leading past said outlet, and a burner mixing chamber having fuel and air supply means and discharging into said combustion chamber, and means for restricting the air openings into said passage and burner mixing chamber at starting.

24. A vaporizer comprising a mixing chamber, a normal fuel supply thereto, a combustion burner and normal fuel supply therefor, and a separate fuel supply for starting said combustion burner in combination with a manually controlled choker for increasing the suction in said mixing chamber and manually actuated means for closing said starting fuel supply and opening said normal fuel supply.

25. A vaporizer comprising a mixing chamber, a normal fuel supply thereto, a high speed fuel supply and auxiliary air supply provided with interconnected control means therefor, a combustion burner and normal fuel supply therefor, and a separate fuel supply for starting said combustion burner in combination with means for closing said normal fuel supply.

26. A vaporizer comprising a mixing chamber, a normal fuel supply thereto, a high speed fuel supply and auxiliary air supply provided with interconnected control means therefor, a combustion burner and normal fuel supply therefor, and a separate fuel supply for starting said combustion burner in combination with means for closing said starting fuel supply and opening said normal fuel supply, and a manually controlled choker for increasing the suction in said mixing chamber.

27. A vaporizer comprising a mixing chamber, a normal fuel supply thereto, a high speed fuel supply and auxiliary air supply provided with interconnected control means therefor, a combustion burner and normal fuel supply therefor, said high speed fuel supply having heat exchange relation with said combustion chamber whereby it is put in condition for rapid vaporization, and a separate fuel supply for starting said combustion burner.

28. A vaporizer comprising a mixing tube and a mixing chamber connected by a throat, a fuel nozzle in said throat, a liquid fuel supply well and duct therefrom to said fuel nozzle, a heating chamber, a suction operated air valve for admitting air to said mixing chamber, a second fuel nozzle between said air valve and mixing chamber, a fuel duct from said well to said second fuel nozzle, said fuel duct passing in proximity to said heating chamber, and means actuated by said air valve for controlling the discharge of fuel vapor from said second nozzle.

29. A vaporizer comprising a mixing tube and a mixing chamber connected by a throat, a fuel nozzle in said throat, a liquid fuel supply well and duct therefrom to said fuel nozzle, a heating chamber, an electric resistance element in association with said heating chamber for starting operation of the vaporizer, a suction operated air valve for admitting air to said mixing chamber, a second fuel nozzle between said air valve and mixing chamber, a fuel duct from said well to said second fuel nozzle, said fuel duct passing in proximity to said heating chamber, and means actuated by said air valve for controlling the discharge of fuel vapor from said second nozzle.

30. A vaporizer comprising a mixing tube and a mixing chamber connected by a throat, a fuel nozzle in said throat, a liquid fuel supply well and duct therefrom to said fuel nozzle, a heating chamber, means for supplying liquid fuel to said heating chamber from said well, an igniting device in said heating chamber, an electric resistance element in association with said heating chamber for starting operation of the vaporizer, a suction operated air valve for admitting air to said mixing chamber, a second fuel nozzle between said air valve and mixing chamber, a fuel duct from said well to said second fuel nozzle, said fuel duct passing in proximity to said heating chamber, and means actuated by said air valve for controlling the discharge of fuel vapor from said second nozzle.

31. A vaporizer comprising a mixing tube and a mixing chamber connected by a throat, a fuel nozzle in said throat, a liquid fuel supply well and duct therefrom to said fuel nozzle, a heating chamber, means for supplying liquid fuel to said heating chamber from said well, an igniting device in said heating chamber, a suction operated air valve for admitting air to said mixing chamber, a second fuel nozzle between said air valve and mixing chamber, a fuel duct from said well to said second fuel nozzle, said fuel duct passing in proximity to said heating chamber, and means for controlling the discharge of fuel vapor from said second nozzle.

32. A vaporizer comprising a mixing tube and a mixing chamber connected by a throat, a fuel nozzle in said throat, a liquid fuel supply well and duct therefrom to said fuel nozzle, a heating chamber, an electric resistance element in association with said heating chamber for starting operation of the vaporizer, a suction operated air valve for admitting air to said mixing chamber, a second fuel nozzle between said air valve and mixing chamber, a fuel duct from said well to said second fuel nozzle, said fuel duct passing in proximity to said heating chamber, and means for controlling the discharge of fuel vapor from said second nozzle, said controlling means being adjustable to the speed and load conditions.

33. A vaporizer comprising a mixing tube and a mixing chamber connected by a throat, a fuel nozzle in said throat, a liquid fuel well and means for supplying fuel therefrom to said nozzle, a heating chamber, means for supplying liquid fuel to said heating chamber from said well, an electric resistance element in association with said heating chamber for starting operation of the vaporizer, a suction operated air valve for admitting air to said mixing chamber, a second fuel nozzle between said air valve and mixing chamber, a fuel duct from said well to said second fuel nozzle, said fuel duct passing in proximity to said heating chamber, and means actuated by said air valve for controlling the discharge of fuel vapor from said second nozzle.

34. In a vaporizer for heavy liquid fuel internal combustion engines, a combustion burner chamber and a fuel supply nozzle discharging therein, a starting means comprising a chamber adapted to hold liquid fuel, an electrode arranged therein for creating an arc adjacent to the fuel, means for introducing air into said chamber, and means for conducting the commingled air and fuel vaporized by said arc to said supply nozzle.

35. In a vaporizer for heavy liquid fuel internal combustion engines, in combination with a fuel supply nozzle, a starting means comprising a chamber adapted to hold liquid fuel, an electrode arranged therein for creating an arc adjacent to the fuel, means for introducing air into said chamber, a valve controlled passage for conducting the commingled air and fuel vaporized by said arc to said supply nozzle, and means for admitting external air through said passage in the closed position of the valve.

36. A vaporizer comprising two mixing chambers connected by a throat, a main fuel supply nozzle in said throat, a combustion chamber discharging into one of said mixing chambers, means for supplying fuel mixture to said combustion chamber, an igniting device therefor, and an auxiliary air valve for diluting the products of combustion from said combustion chamber prior to entering said throat.

37. A vaporizer comprising a fuel supply under control of a float, means for atomizing a part of said fuel with air, a heating chamber connected with said fuel supply by a valved passage, an electrode in said heating chamber for producing an exposed arc whereby to vaporize fuel and commingle it with air therein, and a combustion chamber for commingling and burning said vaporized and atomized fuel.

38. A vaporizer comprising a mixing chamber, normally operative means associated therewith for atomizing liquid fuel, and means operative upon starting for vaporizing liquid fuel, said vaporizing means comprising a closed chamber having an outlet passage to said mixing chamber, means for supplying fuel to said closed chamber from the normal source of supply, and an electrode in said closed chamber for producing an arc therein upon the passage of a suitable electric current.

39. A vaporizer comprising a mixing chamber, normally operative means associated therewith for atomizing liquid fuel, means for burning a part of said atomized fuel to vaporize the remaining part thereof, and means operative upon starting for vaporizing liquid fuel, said vaporizing means comprising a closed chamber having an outlet passage to said mixing chamber, means for supplying fuel to said closed chamber from the normal source of supply, and an electrode in said closed chamber for producing an arc therein upon the passage of a suitable electric current.

40. A vaporizer comprising a primary mixing chamber, normally operative means associated therewith for atomizing liquid fuel, means for burning a part of said atomized fuel to vaporize the remaining part thereof, means for vaporizing additional liquid fuel by the heat generated by said burning fuel, an auxiliary air supply, a secondary mixing chamber for commingling said burned and vaporized fuel and air, and means operative upon starting for vaporizing liquid fuel, said vaporizing means comprising a closed chamber having an outlet passage to said primary mixing chamber, means supplying fuel to said closed chamber from the normal source of supply, and an electrode in said closed chamber for reducing an arc therein upon the passage of a suitable electric current.

41. A vaporizer comprising a primary mixing chamber, normally operative means associated therewith for atomizing liquid fuel, means for burning a part of said atomized fuel to vaporize the remaining part thereof, means for vaporizing additional liquid fuel by the heat generated by said burning fuel, an auxiliary air supply, a secondary mixing chamber for commingling said burned and vaporized fuel and air, and means operative upon starting for vaporizing liquid fuel from the normal source of supply, and mixing it with air independently of said normally operative atomizing means.

42. A vaporizer comprising a primary mixing chamber, normally operative means associated therewith for atomizing liquid fuel, means for burning a part of said atomized fuel to vaporize the remaining part thereof, means for atomizing and vaporizing additional liquid fuel by the heat generated by said burning fuel, an auxiliary air supply and choke valve therefor, a secondary mixing chamber for commingling said burned and vaporized fuel and air, and means operative upon starting for vaporizing liquid fuel from the normal source of supply and mixing it with air independently of said normally operative atomizing means, and control means for said choke valve and starting device for closing the former upon operating the latter.

In testimony whereof, we have signed our names to this specification.

ROBERT F. LONABERGER.
CHARLES F. SANDS.